(12) United States Patent  
Henderson et al.

(10) Patent No.: US 6,393,570 B1  
(45) Date of Patent: May 21, 2002

(54) LOW-POWER APPARATUS FOR POWER MANAGEMENT ENABLING

(75) Inventors: Nathaniel Henderson, San Jose; Eric Davis, Sunnyvale; Kirk Blattman, San Jose; Glenn Connery, Sunnyvale, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/322,378

(22) Filed: May 28, 1999

(51) Int. Cl.[7] ............................................... G06F 1/32
(52) U.S. Cl. ...................................... 713/310; 713/323
(58) Field of Search ................................ 713/300, 310, 713/320, 323, 324, 340

(56) References Cited

U.S. PATENT DOCUMENTS

| | | | | |
|---|---|---|---|---|
| 5,692,197 A | * | 11/1997 | Narad et al. ................ | 713/323 |
| 5,742,833 A | * | 4/1998 | Dae et al. .................... | 713/323 |
| 5,802,305 A | * | 9/1998 | McKaughan et al. ....... | 713/310 |
| 5,835,719 A | * | 11/1998 | Gibson et al. ............... | 713/100 |
| 5,938,771 A | | 8/1999 | Williams et al. ............ | 713/310 |
| 5,983,353 A | * | 11/1999 | McHann, Jr. ................ | 713/310 |
| 6,021,493 A | * | 2/2000 | Cromer et al. .............. | 713/200 |
| 6,189,108 B1 | * | 2/2001 | Cromer et al. .............. | 713/340 |

OTHER PUBLICATIONS

Advanced Micro Devices, Inc., Mar. 1998, 2–pg brochure entitled "*Magic Packet Technology*".
Advanced Micro Devices, Inc., 1998, 6–pg. brochure, entitled "*Magic Packet Technology—White Paper*".
PCI Local Bus "PCI Local Bus Specification", 3 pgs., Revision 2.2, Dec. 18, 1998.
PCI LOcal Bus "PCI Bus Power Management Interface Specification", 71 pgs. Revision 1.1, Dec. 18, 1998.

* cited by examiner

*Primary Examiner*—Xuan M. Thai
(74) *Attorney, Agent, or Firm*—Mark A. Haynes; Haynes Beffel & Wolfeld LLP

(57) ABSTRACT

Low power event monitoring enabling logic allows wake up devices to maintain their proper functionality in the event of a momentary power loss, or in the event the operating system does not properly load upon power-up. The technology is particularly suited for use with network interface card supporting Wake-On-LAN functions. A component with low power enabling logic is provided for a system having power management resources responsive to power management event signals to switch to an operating state. The component comprises power logic having a first mode in which power consumption is limited to a first specified level and a second mode in which power consumption is limited to a second specified level higher than the first specified level. The component includes an interface to nonvolatile memory storing a control signal. Logic is coupled to the interface to the nonvolatile memory and responsive to detection of a power supply voltage to read in the first mode the control signal from the nonvolatile memory, and to the signal the power logic to enter the second mode in response to a specified state of the control signal. Monitoring resources operating in the second mode monitor for an event, and in response to detection of the event produce a signal to cause the system switch to the operating mode.

17 Claims, 3 Drawing Sheets

LOW-POWER APPARATUS FOR POWER MANAGEMENT ENABLING

BACKGROUND OF THE INVENTION

1. Field of the Invention

The present invention relates to techniques for controlling power management functions in computer systems, and more particularly to the problem of maintaining proper power consumption during power management processes.

2. Description of Related Art

The control of power supplied to computer systems is used in many environments. For example, management of computer networks is accomplished in many systems by a central network management station which has access to end stations in the network for management functions. However, in complex network environments, many of the end stations are turned off at night or at other times when they are not in use, either manually or automatically by power management circuits. This prevents the network management station from gaining access to the end station, limiting the ability to effectively manage the network. Thus, technology has evolved which allows a remote network management station to wake-up an end station in the network to allow it to perform network management processes, or otherwise communicate with the end station. Such technology is referred to generally as Wake-On-LAN herein. The Wake-On-LAN feature of network adapter cards in personal computers allows network administrators to remotely boot powered off end systems. One popular technology for implementing the Wake-On-LAN feature is referred to as the "Magic Packet" technology, developed by Advanced Micro Devices, Inc. See "Magic Packet Technology—White Paper" Advanced Micro Devices, Inc., issued November 1995.

One popular bus system used with computer systems that support wake up devices, like Wake-On-LAN network interface cards is known as the PCI Local Bus, or PCI bus. The *PCI Local Bus Specification*, Revision 2.2, (PCI Special Interest Group, Dec. 18, 1998) (herein PCI 2.2) places strict power requirements on wake-up devices in systems using PCI bus compliant buses. According to PCI 2.2, system software is given the job of managing the different power-use states, but an inherent problem arises when a black-out or a momentary loss of power creates a situation in which the software cannot operate as designed. In this case, the wake-up devices may draw more power than the system has available, and at the same time, may not be able to wake-up the computer properly. To ensure proper wake-up operation even after a power loss the hardware must be capable of dealing with the situation.

The *PCI Bus Power Management Interface Specification*, Revision 1.1, PCI Special Interest Group, (Dec. 18, 1998) defines three different power states to be controlled by the operating system. The operating system is given the task of power management since it knows when the system is busy and when it is idle. (See *PCI Bus Power Management Interface Specification*, page 9) Unfortunately the dominating operating systems today (Windows/DOS) are not very stable and are prone to crashes. This unreliability coupled with the fact that an unintentional power cycling may cause the computer to power-up in an is unknown state requires hardware to make allowances to operate properly in the absence of software control.

The different states of power management define the amount and type of activity allowed on the PCI bus for a given state. In the normal process of going into the power-down state (D3 cold) the operating system enables specific devices to be able to wake up the system on a predefined wake up event by setting a Power Management Enable select PME_En bit in a status register associated with the PCI bus controller. Once at least one device is enabled to wake-up the machine, the system can remove power from the power-rails on the PCI bus. At this point the only power available on the PCI bus comes from an auxiliary power pin (A14.) If a PCI device has been enabled to wake up the machine it is allowed to draw up to 375 ma of current from the A14 pin. If the PCI device is not enabled it can only draw a maximum of 20 ma.

So in a given PCI 2.2 compliant computer with multiple wake-up devices, if the operating system places the computer in the D3-cold power state, some devices will be allowed to wake-up the computer and correspondingly these same devices will be allowed to draw 375 ma of current from pin A14. Any device that is not enabled to wake up the computer can only draw 20 ma. The operating system must know the limitations of the power supply and not enable more devices than the power supply can handle.

In the D3-cold state, all PCI signals and power pins (except A14) are turned off, floating to ground (VSS). Since the reset pin on the PCI bus is active low, the power-management logic cannot be reset by this signal. If the power-management logic were reset by this signal it would be in a continual reset state during the D3-cold power state, and the logic would be unable to wake up the computer. This is the reason why the PME_Select bit, defined in the Power-Management Control Register is considered a "sticky bit." This bit has no reset defined in the *PCI Bus Power Management Interface Specification*. The PME_Select bit, which enables the PCI device to wake up the PC, and enables it to draw power from pin A14, is considered to be in an indeterminate state at power-up of the auxiliary power line. Only once the operating system has loaded and has had a chance to write this bit is it properly specified.

By defining the PME_En bit as indeterminate at power-up the *PCI Power Management Interface Specification* avoids some types of ambiguity. Nevertheless this indeterminacy could cause system failures if the system cycles auxiliary power off and on in the D3-cold power state. In this case, the PME_En bit set by the operating system may be lost. Therefore, if auxiliary power cycles in a D3 state many the devices on the PCI bus could take more power than the power-supply can handle in a D3-cold power state. This could result in the system not booting correctly or in extreme cases in the failure of source hardware in the PC.

Thus, client Wake-On-LAN devices or other power management clients, need to be properly configured to be able to wake-up the system. However, the configuration cannot be done reliably, when the system is susceptible to improper power down events, like the plug being accidently kicked out of the wall, a power blackout, or a power surge.

It is desirable to provide an apparatus that can properly initialize the wake-up functionality of a PCI device using only 20 ma of power, and which is extendable to a variety of bus systems and system components on the bus systems that monitor for power management events.

SUMMARY OF THE INVENTION

The present invention enables power management event monitoring in client components of a computer system, without requiring the client component to rely on the host operating system configured parameters to protect against overloading in the system power supply. This technique involves enabling the monitoring function in a low-power mode, and switching to an operating power mode only after the component is assured that it is validly configured to do so.

The low power event monitoring enabling of the present invention allows wake up devices to maintain their proper functionality in the event of a momentary power loss, or in the event the operating system does not properly load upon power-up. The invention is particularly suited for use with network interface card supporting Wake-On-LAN functions.

The present invention comprises a component for a system having power management resources that are responsive to power management event signals to switch to an operating state. Such systems in preferred embodiments include PCI bus systems with host computers and PCI client components coupled to the bus systems. The component according to the present mention comprises power logic having a first mode in which power consumption is limited to a first specified level and a second mode in which power consumption is limited to a second specified level higher than the first specified level. The component includes an interface to nonvolatile memory storing a control signal. Logic is coupled to the interface to the nonvolatile memory and responsive to detection of a power supply voltage to read in the first mode the control signal from the nonvolatile memory, and to the signal the power logic to enter the second mode in response to a specified state of the control signal. Monitoring resources operating in the second mode monitor for an event, and in response to detection of the event produce a signal to cause the system switch to the operating mode.

In one aspect of the invention, the system includes bus, and the signal produced by the monitoring resources includes driving a specified line on the bus to a signal state. In one preferred example, the bus is compliant with a *PCI Bus Power Management Interface Specification* including a power management event line. In this example, the signal includes driving the power management event line on the bus to a signal state.

In one embodiment, the nonvolatile memory comprises memory cells on an integrated circuit on the same circuit board as the other elements of the component. In another embodiment, the nonvolatile memory comprises an array of nonvolatile memory cells on the same integrated circuit as the other elements of the component.

In yet another embodiment, the component comprises an integrated circuit, including power logic coupled to an auxiliary power line on the system bus. The power logic has a first mode in which consumption of power from the auxiliary power line is limited to the first specified level, and a second mode in which power consumption from the auxiliary power line is limited to a second specified level higher than the first specified level. An interface to the non-volatile memory storing a control signal is provided on the integrated circuit. The power detector on integrated circuit signals a power on event on the auxiliary power line. Logic on integrated circuit is provided to read in the first mode the control signal from the nonvolatile memory, and to signal the power logic to switch into the second mode in response to a specified state of the control signal. Integrated circuit in one embodiment also includes a network media access controller. Monitoring resources monitor the media access controller for receipt of a network packet indicating that the system should wake-up. Upon receipt of such packet, the power management enable signal is produced on the system bus.

Using the apparatus of the present invention, a computer can easily be configured to be able to wake-up properly after an unexpected power loss. The apparatus does not affect the normal power up sequence in any way. The control bit stored on nonvolatile memory coupled to the event monitoring component affects the circuit only when in the power up sequence is abnormal. Although the preferred embodiment of the present invention pertains to network interface cards such as Ethernet controllers, it is applicable to any system component that has event monitoring capability.

This invention completely complies with the PCI power-management specification, but goes further by dealing systematically with the issue of blackouts or other forms of power outages.

Other aspects and advantages of the present invention can be seen on review of the figures, the detailed description, and the claims which follow.

DETAILED DESCRIPTION

Figure 1:
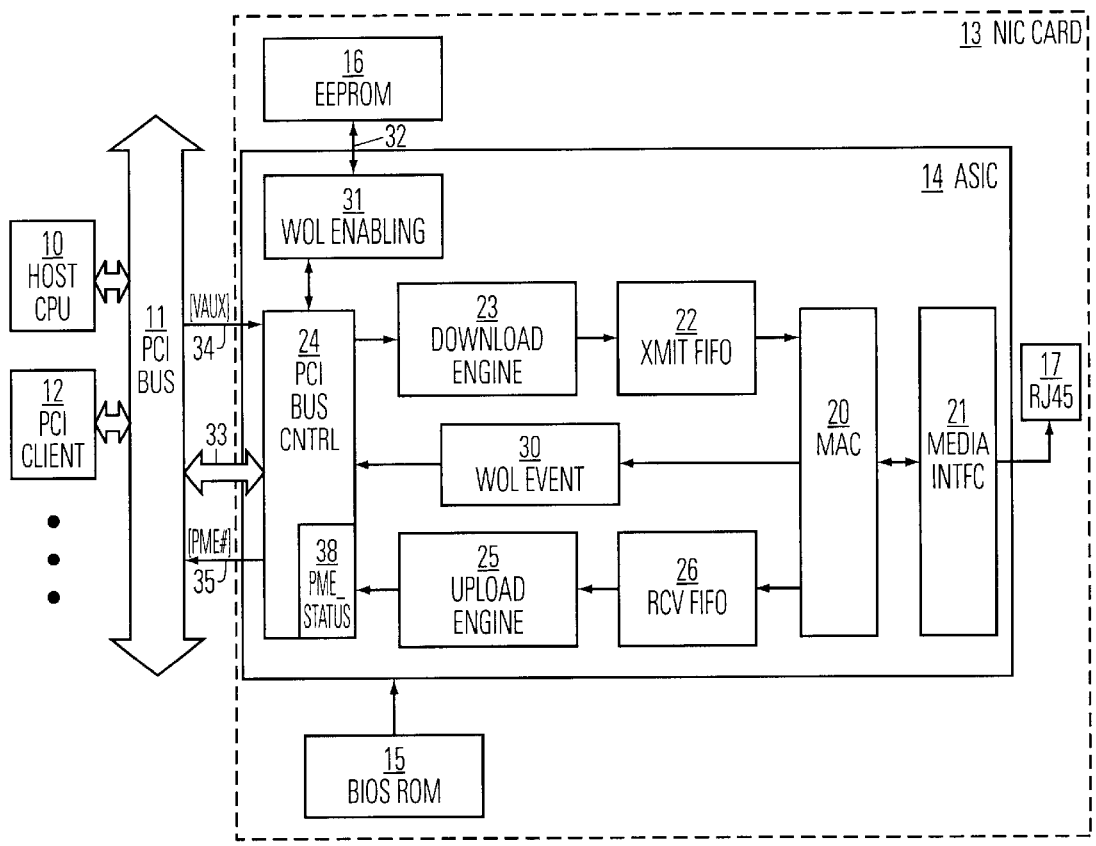
FIG. 1 is a block diagram of a system, including a component monitoring for power management events according to the present invention.
Figure 2:
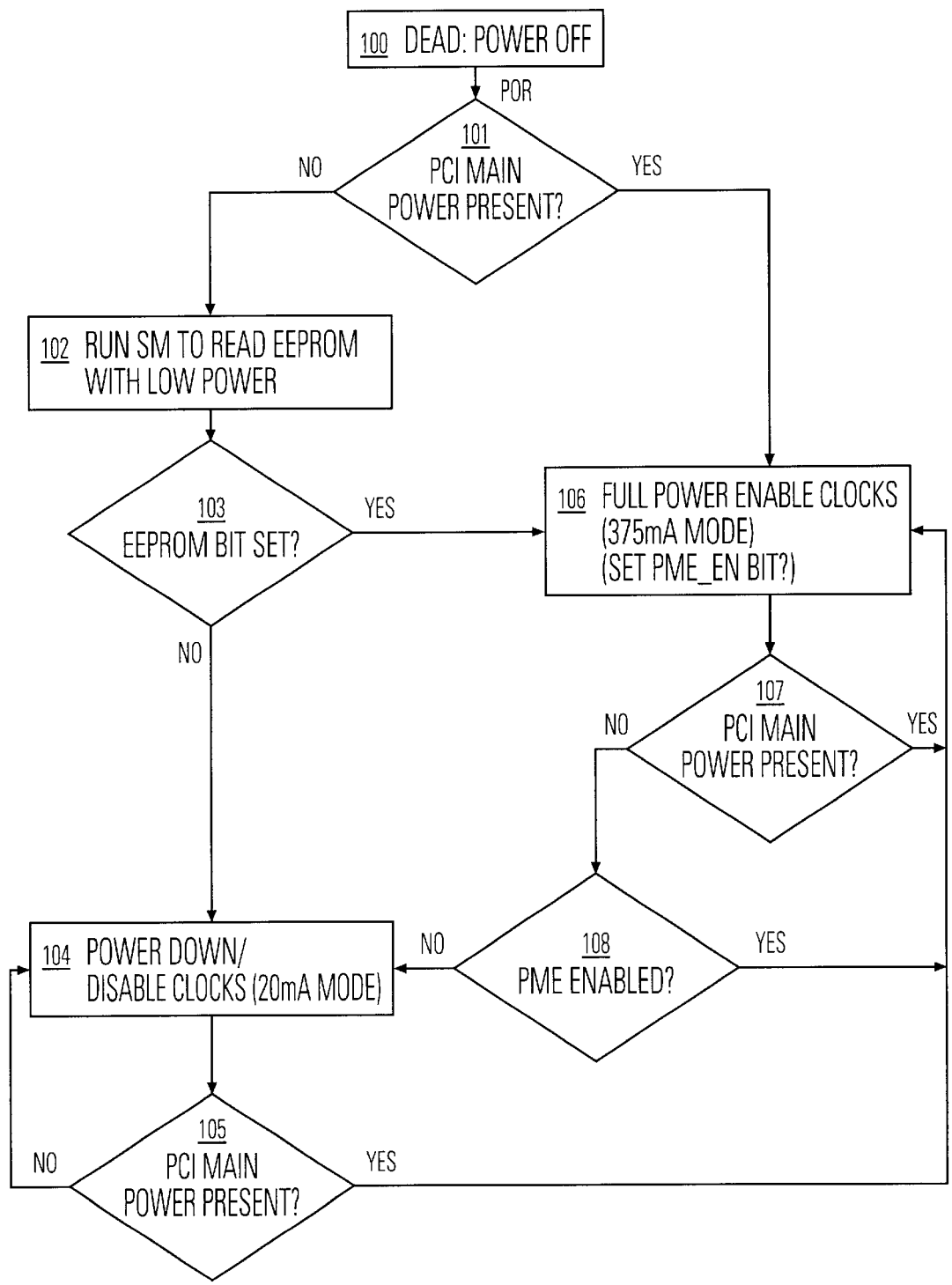
FIG. 2 is a flow chart showing operation of the monitor enabling state machine in the component of FIG. 1.
Figure 3:
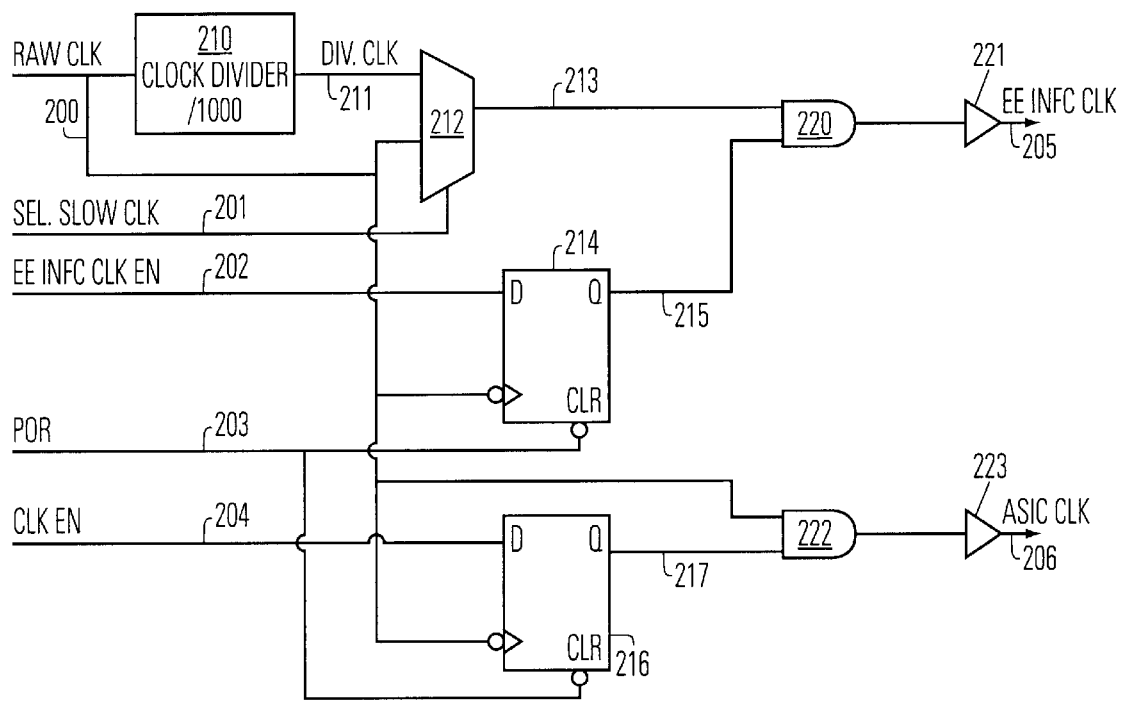
FIG. 3 illustrates power mode logic used in the component of FIG. 1.

A detailed description of the present invention is provided with reference to FIGS. 1–3. The described embodiment supports a network interface card having Wake-On-LAN capability. The invention is suitable for use with a variety of components of computer systems that include resources for monitoring for events that signal a need to power on the host system.

FIG. 1 provides a basic diagram of a computer system having a host CPU 10 coupled to a bus system 11, such as a PCI bus. The bus 11 interconnects a plurality of PCI clients, including client 12 and the network interface card 13 shown with expanded functional blocks. The network interface card 13 includes an application specific integrated circuit ASIC 14. The ASIC 14 includes network interface functions for an Ethernet interface in this embodiment. Other embodiments provide interfaces to other types of the network media. In addition to the ASIC 14, other components are interconnected by and supported by the circuit board of the network interface card 13. In this example, a BIOS ROM 15, an EEPROM 16, and an RJ45 connector 17 are on the circuit board.

The ASIC 14 includes a medium access controller 20 coupled to media interface circuitry 21 to the connector 17. The medium access controller 20 is also coupled to a transmit FIFO buffer 22 which is driven by a download engine 23 on the ASIC 14. The download engine 23 is coupled to a PCI bus controller 24. The PCI bus controller 24 is also coupled to an upload engine 25. The upload engine 25 is coupled to a receive FIFO 26 which is connected to the medium access controller 20. Thus, the illustration of the ASIC 14 includes basic elements of a network interface controller chip.

In addition, the ASIC 14 includes resources 30 coupled to the medium access controller 20 which monitor for a Wake-On-LAN event. In the typical environment, such event comprises the receipt of a network packet that is specially configured to indicate that the host should be turned on. Technology supporting this monitoring function is described, for example, in the paper mentioned above entitled, "Magic Packet Technology—White Paper" Advanced Micro Devices, Inc., issued November 1995.

In addition, the ASIC 14 includes the monitor enabling logic 31, in this example used for enabling the Wake-On-LAN function. The enabling logic 31 is coupled to the PCI bus controller 24, and includes an interface 32 to nonvolatile memory, which in this case comprises the EEPROM 16. Other nonvolatile memory technology can be utilized as suits a particular implementation. Also in this example, the EEPROM 16 is a separate integrated circuit mounted on the network interface card 13. In alternative embodiments, the EEPROM, or other nonvolatile memory technology can be implemented on the ASIC 14, or mounted on other circuit boards or in the host chassis.

The PCI bus controller 24 is coupled to the PCI bus 11 which includes a variety of signal lines represented by arrow 33. The PCI bus 11 also includes an auxiliary voltage line VAUX 34, and a power management enable line PME# 35. The detailed specifications for the VAUX line 34 and the PME# line 35 are provided in the *PCI Bus Power Management Interface Specification*, Revision 1.1, Dec. 18, 1998, which is incorporated by reference as if fully set forth herein.

The enabling logic 31 includes a state machine which has a low-power mode, and a higher power mode. In the PCI environment, the low-power mode has a specified maximum of 20 milliAmps power consumption off of the auxiliary voltage line VAUX 34. In the high power mode, the maximum power consumption is specified at 375 milliAmps of auxiliary power. The state machine operates basically according to the flow chart shown in FIG. 2.

The flow chart of FIG. 2 begins assuming that the system is dead and all power is off, including the auxiliary power (block 100). The PCI bus controller 24 monitors power on the auxiliary voltage line 34. Upon detection of a power up event, a power on reset POR signal is generated. This causes the state machine transition to test whether the main PCI bus power is present (block 101). If the main power is not present, then the state machine is executed to read the EEPROM 16 with low-power (block 102). The logic then determines whether a specified bit in the EEPROM is set (block 103). If the specified bit is not set, then the algorithm transitions to power down completely and disable all clocks, resulting in the system entering the low-power mode consuming less than 20 milliamps (block 104). In the low-power mode, the PCI bus controller 24 monitors for main PCI power (block 105). If no power is detected at block 105, then the algorithm loops back to block 104 and continues.

If at block 101,or if it block 105, it is detected that PCI main power is present, then the algorithm loops to the enable full power and enable all clocks on the system (block 106). In this state, the event monitoring logic 30 is controlled by software according to the PCI specifications. If software enables the event monitoring logic by setting the PME__En bit, the event monitoring logic 30 is fully operational. If an event is detected in the logic 30, then the PCI bus controller 24 asserts the PME# line 35 to cause a power management event in the host system.

If at block 103, it is determined that the specified bit is set in the the EEPROM 16, then the logic transitions to block 106, and in block 106 different control bits in the EEPROM 16 can cause the state machine to take the additional step of setting the PME__En parameter in the PMI status register 38 in the PMI bus controller 24.

After block 106, the system continues to monitor for PCI main power (block 107). If power is present, then the logic loops back to block 106 and continues. If power is not present, then the logic monitors the PME__En bit in the status register 38 (block 108). If the PME__En bit is set, then the algorithm loops to block 106 and continues. If the PME__En bit is not set at this point in the algorithm, then the logic switches to block 104 to enter the low-power state.

Accordingly, the functionality of the present invention is based on determining the type of initial power of the ethernet controller ASIC is experiencing. The apparatus distinguishes between two different kinds of initial power of sequences, including a normal power up sequence, and an auxiliary voltage only or abnormal power up sequence. The normal power up sequence is defined by the presence of power on the main power rails of the PCI bus. If the initial power up sequence can only source power from the auxiliary VAUX line 34, then it is considered to be an abnormal power up sequence. This abnormal power up sequence indicates that the preceding system shutdown was done improperly.

With reference to FIG. 2, it is shown that the power off state is left in response to a power on reset circuit, The power on reset circuit produces a clean pulse at the initial power on of the ethernet controller ASIC, either by the auxiliary voltage alone, or by the PCI main power bus. The next decision is made by monitoring power on the main PCI power rails. If there is power present on the main PCI power rails, then the ASIC can be fully powered and all clocks within the ASIC can be enabled. However, if there is no power on the PCI main power rails during initialization, it becomes necessary to limit power usage to 20 milliamps until it can be determined if the ethernet controller can source power in an abnormal power up. This determination is made using a single bit in nonvolatile memory coupled with the ASIC. The nonvolatile memory could be external or internal to the ASIC. Also, the nonvolatile memory technology may be based on the EEPROM, flash memory or some other nonvolatile memory technology. If the specific bit is set, it indicates to the ethernet controller that it is allowed to source 375 milliamps of power, even though the power up was abnormal. If the bit is not set, the ethernet controller must limit its power consumption to less than 20 milliamps. The low-level of power consumption is achieved by powering down all the circuitry within the ASIC, and turning off all clocks.

According to the present invention, the apparatus reads the EEPROM or other nonvolatile memory using a low-power mode, consuming less than 20 milliamps in the PCI environment. Thus, the ASIC operates while complying with the low-power requirements.

The low-power mode for reading the nonvolatile memory is achieved in a preferred embodiment by slowing down the clocks be utilized during the initial phases of the Wake-On-LAN monitor enabling logic. Other techniques can be utilized, such as providing circuitry to enable only such logic and clocks signals as necessary for the limited purpose of enabling the monitoring function. Also a combination of slowing down the clocks and selectively enabling various components could be utilized. The preferred embodiment the clock used at the interface for reading the EEPROM is slowed down to about 150 Hz. In this way, the EEPROM can be read with the total board power consumption under 20 milliamps in one tested system.

Accordingly, whenever the ASIC 14 powers up improperly, with auxiliary power only, the low-power state machine is put into operation to read the specified bit in the EEPROM. Once the bit is read, the ASIC will either completely shutdown, or it will be allowed to enable clocks and continue all its normal initialization sequences.

FIG. 3 illustrates at a basic level, power logic used for managing the power consumed in a low-power mode capable of reading the external EEPROM, and in the normal operating mode. As mentioned above, a variety of power saving techniques can be applied. It is found that controlling the interface clock for the EEPROM, as shown in this example, satisfactorily manages power consumption during the enabling of the Wake-On LAN function in the network interface card 13 of FIG. 1.

The inputs to the power logic of FIG. 3 include RAW CLK on line 200, SELECT SLOW CLK on line 201, EE INFC CLK EN on line 202, POR on line 203, and CLK EN on line 204. The outputs include the EE INFC CLK on line 205 and the ASIC CLK on line 206.

The RAW CLK on line 200 supplied by a main clock, runs at 25 MHz in the preferred embodiment, whenever power is applied to the ASIC. This RAW CLK clock runs the state machine described in FIG. 2. The keep the chip power used under the low-power mode specification, this clock is applied to very few flip flops on the ASIC.

The SELECT SLOW CLK on line 201 is used as a control signal to switch the clocks at the EEPROM interface logic 32 shown in FIG. 1. The interface logic produces all the control, address and data signals that are used to communicate with an external, serial EEPROM device in the example described. The SELECT SLOW CLK on line 201 is true when the state machine is in the run low-power state machine state 102 of FIG. 2. To conserve power in the low-power state, the low frequency clock at 25 kHz (DIV CLK described below) is applied to the state machine. The SELECT SLOW CLK on line 201 is asserted when there is no PCI power, and the process of reading the EEPROM bit is not finished, or the process is finished and the bit was false.

The EE INFC CLK EN on line 202 is a control signal used to gate the clocks off completely to the EEPROM interface logic. The EE INFC CLK EN on line 202 is false only in the power down state.

The POR on line 203 is an active low, power-on-reset signal. The POR on line 203 asserts a low signal asynchronously anytime a power up occurs. De-assertion of the signal is guaranteed to be synchronous to the RAW CLK on line 200.

The CLK EN on line 204 is used to enable the main ASIC clock to all logic. When CLK EN on line 204 is low, substantial power savings are achieved. The CLK EN on line 204 is only true during the full power state of the device. The CLK EN on line 204 is asserted when there is PCI power, or when there is not PCI power but PME_En is set.

The RAW CLK on line 200 a supplied to a clock divider 210. The output of the clock divider 210 in this example is a divided clock DIV CLK on line 211. In this example embodiment, where the RAW CLK on line 200 operates at 25 MHz, the DIV CLK on line 211 operates at 25 kHz. The RAW CLK on line 200 and the DIV CLK on line 211 are supplied to multiplexer 212. The multiplexer 212 is responsive to the SELECT SLOW CLK on line 201 to select either the RAW CLK on line 200 or the DIV CLK on line 211 as output on line 213.

The EE INFC CLK EN on line 202 is supplied to the D input of the flip flop 214. The flip flop 214 is clocked by falling edge of the RAW CLK on line 200. The flip flop 214 is cleared in response to the POR on line 203. The output of the flip flop 214 a supplied on line 215.

The CLK EN on line 204 is supplied to the D input of the flip flop 216. The flip flop 216 is clocked by falling edge of the RAW CLK on line 200. The flip flop 214 is cleared in response to the POR on line 203. The output of the flip flop 216 a supplied on line 217.

The output on line 215 of the flip flop 214 a supplied as an input to AND gate 220. The AND gate 220 enables the supply of the signal on line 213 through a clock buffer 221 as the EE INFC CLK on line 205. Thus, the EE INFC CLK on line 205 the supplied as the RAW CLK on line 200 or as the DIV CLK on line 211 depending on the signal on line 201, and the state of the enable signal stored in flip flop 214. The EEPROM Interface logic includes clock control circuits to divide the clock down further, so that at full RAW CLK speed the EEPROM speed limitations are met. In this example, the EEPROM read clock produced by that interface logic will be about 150 Hz with the DIV CLK on line 211 as input.

The output on line 217 of the flip flop 216 is supplied as an input to AND gate 222. The second input to the AND gate 222 is the RAW CLK on line 200. Thus the signal on line 217 enables the supply of the RAW CLK on line 200 through a clock buffer 223 as the ASIC clock on line 206.

Although the specified bit in the EEPROM is used to enable power consumption, in order for the ethernet controller to be fully enabled as a Wake-On-LAN device, the PME_En bit in the power management control register 38 must also be set. This bit may be set in response to the specified bit which was read at block 103 of the flow chart in FIG. 2. Alternatively, this bit may be set in response to other data stored in the EEPROM and read during the initialization sequence.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A component for a system having power management resources responsive to power management event signals to switch to an operating state; the component comprising:

power logic having a first mode in which power consumption is limited to a first specified level, and a second mode in which power consumption is limited to a second specified level higher than the first specified level;

an interface to nonvolatile memory storing a control signal;

logic, coupled to the interface to nonvolatile memory and responsive to detection of a power supply voltage, to read in the first mode the control signal from the nonvolatile memory, and to signal the power logic to enter the second mode in response to a specified state of the control signal; and monitoring resources operating in the second mode which monitor for an event, and in response to detection of the event, produce a signal to cause the system to switch to the operating mode.

2. The component of claim 1, wherein the system includes a bus, and the signal includes driving a specified line on the bus to a signal state.

3. The component of claim 1, wherein the system includes a bus compliant with a PCI Bus Power Management Interface Specification including a power management event line PME#, and the signal includes driving the power management event line on the bus to a signal state.

4. The component of claim 1, wherein the component includes a circuit board, and the nonvolatile memory comprises memory cells in an integrated circuit on the circuit board, and coupled to the interface.

5. The component of claim 1, wherein the nonvolatile memory comprises an array of nonvolatile memory cells coupled with the interface.

6. The component of claim 1, wherein the power logic, the interface, the logic to read, and the monitoring resources comprise circuits on a single integrated circuit, and the nonvolatile memory comprises memory on the single integrated circuit.

7. The component of claim 1, including an interface to a network medium, and wherein the event includes receipt on the interface of a network data packet addressed to the component.

8. A component for a system having a system bus including a normally on auxiliary power line, and power management resources responsive to power management event signals on the system bus to switch to an operating state; the component comprising:

power logic, coupled to the auxiliary power line, and having a first mode in which power consumption from the auxiliary power line is limited to a first specified level, and a second mode in which power consumption from the auxiliary power line is limited to a second specified level higher than the first specified level;

an interface to nonvolatile memory storing a control signal;

power detector, coupled to the auxiliary power line, to signal a power on event on the auxiliary power line;

logic, coupled to the interface to nonvolatile memory and responsive to a detected power on event, to read in the first mode the control signal from the nonvolatile memory, and to signal the power logic to enter the second mode in response to a specified state of the control signal; and monitoring resources operating in the second mode which monitor for an event, and in response to detection of the event, produce a power management event signal on the bus.

9. The component of claim 8, wherein the system bus comprises a bus compliant with a PCI Bus Power Management Interface Specification.

10. The component of claim 8, including a circuit board interconnecting and supporting the power logic, the interface, the logic to read, and the monitoring resources, and wherein the nonvolatile memory comprises memory cells in an integrated circuit on the circuit board, and coupled to the interface.

11. The component of claim 8, wherein the nonvolatile memory comprises an array of nonvolatile memory cells coupled with the interface.

12. The component of claim 8, wherein the power logic, the interface, the read logic, and the resources comprise circuits on a single integrated circuit, and the nonvolatile memory comprises memory on the single integrated circuit.

13. The component of claim 8, including an interface to a network medium, and wherein the event includes receipt on the interface of a network data packet addressed to the component.

14. A component for a system having a system bus including a normally on auxiliary power line, and power management resources responsive to power management event signals on the system bus to switch to an operating state; the component comprising:

an integrated circuit, the integrated circuit including
power logic, coupled to the auxiliary power line, and having a first mode in which power consumption from the auxiliary power line is limited to a first specified level, and a second mode in which power consumption from the auxiliary power line is limited to a second specified level higher than the first specified level;

an interface to nonvolatile memory storing a control signal;

power detector, coupled to the auxiliary power line, to signal a power on event on the auxiliary power line;

logic, coupled to the interface to nonvolatile memory and responsive to a detected power on event, to read in the first mode the control signal from the nonvolatile memory, and to signal the power logic to enter the second mode in response to a specified state of the control signal;

a network medium access controller; and monitoring resources operating in the second mode which monitor the network medium access controller for receipt of a network packet signaling the system to power on, and in response to detection of the network, produce a power management event signal on the bus.

15. The component of claim 14, wherein the system bus comprises a bus compliant with a PCI Bus Power Management Interface Specification.

16. The component of claim 14, including a circuit board supporting the integrated circuit, and wherein the nonvolatile memory comprises memory cells in another integrated circuit on the circuit board, and coupled to the interface.

17. The component of claim 14, wherein the nonvolatile memory comprises an array of nonvolatile memory cells in the integrated circuit.

* * * * *